United States Patent
Sollart

(10) Patent No.: US 8,825,336 B2
(45) Date of Patent: Sep. 2, 2014

(54) METHOD FOR DETECTING A BURNOUT STATE DURING WHICH DRIVEN WHEELS ARE CAUSED TO SPIN

(75) Inventor: Willem Sollart, Meudt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/586,532

(22) Filed: Aug. 15, 2012

(65) Prior Publication Data

US 2013/0073166 A1    Mar. 21, 2013

(30) Foreign Application Priority Data

Aug. 16, 2011   (DE) .................... 10 2011 110 612

(51) Int. Cl.
| | |
|---|---|
| *B60K 28/16* | (2006.01) |
| *B60W 30/184* | (2012.01) |
| *B60W 40/09* | (2012.01) |
| *B60W 30/18* | (2012.01) |
| *B60W 10/18* | (2012.01) |
| *B60W 10/16* | (2012.01) |
| *B60W 10/06* | (2006.01) |

(52) U.S. Cl.
CPC .......... *B60K 28/16* (2013.01); *B60W 30/18009* (2013.01); *B60W 2520/28* (2013.01); *B60W 10/182* (2013.01); *B60W 10/16* (2013.01); *B60W 2710/0677* (2013.01); *B60W 2520/10* (2013.01); *B60W 30/184* (2013.01); *B60W 40/09* (2013.01); *B60W 2510/0638* (2013.01); *B60W 10/06* (2013.01)
USPC ............................................. 701/84; 701/82

(58) Field of Classification Search
CPC ....................................................... B60K 28/16
USPC ....................................................... 701/84, 82
See application file for complete search history.

(56) References Cited

U.S. PATENT DOCUMENTS

| | | | | |
|---|---|---|---|---|
| 4,860,847 | A | * | 8/1989 | Shiraishi et al. ............... 180/197 |
| 5,050,454 | A | | 9/1991 | Yamaguchi et al. |
| 5,682,316 | A | * | 10/1997 | Hrovat et al. .................... 701/84 |
| 6,493,622 | B1 | * | 12/2002 | Erban .............................. 701/84 |
| 6,494,282 | B1 | * | 12/2002 | Hessmert et al. ............. 180/197 |
| 6,782,961 | B1 | * | 8/2004 | Ishikawa et al. .............. 180/197 |
| 7,421,327 | B2 | * | 9/2008 | Romer et al. .................... 701/69 |

(Continued)

FOREIGN PATENT DOCUMENTS

| | | |
|---|---|---|
| DE | 102005035302 A1 | 2/2007 |
| DE | 102005035303 A1 | 2/2007 |

(Continued)

*Primary Examiner* — Helal A Algahaim
*Assistant Examiner* — Donald J Wallace
(74) *Attorney, Agent, or Firm* — Ingrassia Fisher & Lorenz, P.C.

(57) ABSTRACT

A method for detecting a burnout state during which driven wheels of a motor vehicle are caused to spin is provided. The method includes detecting a rotational wheel speed of a first driven wheel and a rotational wheel speed of a second driven wheel and comparing the rotational wheel speed of the faster turning wheel with a first constant. A vehicle speed is detected and compared with a second constant. An engine rotational speed is detected and compared with a third constant. The burnout state is detected when the rotational wheel speed of the faster turning wheel is greater than the first constant, the vehicle speed is less than the second constant, and the engine rotational speed is greater than the third constant.

14 Claims, 2 Drawing Sheets

(56) References Cited

U.S. PATENT DOCUMENTS

| | | | |
|---|---|---|---|
| 7,680,571 B2* | 3/2010 | Fayyad et al. | 701/33.9 |
| 2005/0080547 A1* | 4/2005 | Scelers et al. | 701/82 |
| 2005/0085988 A1* | 4/2005 | Ushiroda et al. | 701/80 |
| 2005/0102087 A1* | 5/2005 | Sawada et al. | 701/82 |
| 2009/0112437 A1* | 4/2009 | Luehrsen et al. | 701/84 |
| 2010/0138130 A1* | 6/2010 | Nam et al. | 701/86 |
| 2011/0004386 A1* | 1/2011 | Kinder et al. | 701/70 |

FOREIGN PATENT DOCUMENTS

| | | |
|---|---|---|
| DE | 102005051145 A1 | 5/2007 |
| DE | 102006012883 A1 | 9/2007 |
| DE | 102009028935 A1 | 3/2011 |

* cited by examiner

METHOD FOR DETECTING A BURNOUT STATE DURING WHICH DRIVEN WHEELS ARE CAUSED TO SPIN

CROSS-REFERENCE TO RELATED APPLICATION

This application claims priority to German Patent Application No. 10 2011 110 612.3, filed Aug. 16, 2011, which is incorporated herein by reference in its entirety.

TECHNICAL FIELD

The technical field relates to a method for detecting a burnout state during which driven wheels of a motor vehicle are caused to spin.

BACKGROUND

When a driven wheel is caused to spin by a driver, in particular over a longer period of time, this causes an increased wear on a drive train between an engine and the driven wheel. Systems and methods are already known that are intended to prevent a spinning of the driven wheels. An anti-slip control is mentioned as an example here, which from a certain speed prevents the driving off on a slippery surface through a targeted brake intervention and if applicable an intervention in an output engine power. However, these systems can be deactivated beforehand.

It is at least one object herein to provide a method for detecting if at least one driven wheel is caused to spin. In addition, other objects, desirable features and characteristics will become apparent from the subsequent summary and detailed description, and the appended claims, taken in conjunction with the accompanying drawings and this background.

SUMMARY

Accordingly, a method for detecting a burnout state during which driven wheels of a motor vehicle are caused to spin is provided. The method includes:
a) detecting a rotational wheel speed of a first driven wheel and a rotational wheel speed of a second driven wheel, determining the difference between the rotational wheel speed of the first driven wheel and the rotational wheel speed of the second driven wheel, and comparing the absolute value of the difference with a first constant,
b) detecting a vehicle speed and comparing the vehicle speed with a second constant,
c) detecting an engine rotational speed and comparing the engine rotational speed with a third constant,
d) wherein the burnout state is detected when one of the two detected rotational wheel speeds is greater than or equal to the first constant, the vehicle speed is below or equal to the second constant and the engine rotational speed is above or equal to the third constant.
As described below, additional factors may be considered to establish a burnout state, including the accelerator pedal position, the status of the parking brake activation, the status of the electronic stability program ESP, and/or the torque output of the engine.

When such a burnout state is detected, a bit or a flag can be set internally in a program or externally in a circuit. A plurality of bits or flags can also be used. A signal can also be set that passes on the burnout state. The bit can be an electronically processable binary figure, while is immaterial if a bit is set from 0 to 1 or from 1 to 0.

Through a method thus configured, a burnout state can be recognized in all cases in which the driver is not concerned about making headway but concerned about performing a so-called burnout. In the case of a burnout, driven wheels are caused to spin, as a result of which the tires are heated up intensely. Since with motor vehicles without a differential lock the wheel which has the lower static friction as a rule is the wheel that spins and since sliding friction is lower than static friction, a driven wheel on the other side of the differential does not co-rotate. The rotational speed differential between the standing wheel and the spinning wheel is compensated by a differential. Here, an unusually great load is acting on the differential, which in normal driving mode is used in such a manner maximally for a short period. Because of this, damages in the differential can occur. The first constant can be set, for example, to about 100 revolutions per minute up to about 1,000 revolutions per minute. The second constant can be set to about 1 km/h to about 5 km/h. The third constant can be set to about 2,000 revolutions per minute up to about 4,000 revolutions per minute. Instead of constants, values from characteristic curves or families of characteristics can also be determined.

According to an embodiment, the engine power upon detection of a burnout is steadily reduced to a lower value. This can be effected over a certain period of time. The period of time in this case can be selected from about 1 second to about 12 seconds long, in particular from about 2 seconds to about 6 seconds long. A steady reduction of the power that is available results in that the drive wheel that was caused to spin comes to a halt at some time or other or static friction is created again. Under certain conditions, the driver may not even notice a steady intervention. In addition, a spinning of a wheel on slippery surface (for example snow and ice) is not to be prevented with the method, so that the driver can drive the motor vehicle clear and above all does not feel being patronized by the technology.

According to another embodiment, the engine power is reduced in a burnout state at least via a reduction of an engine rotational speed, so that the loading of the differential with spinning wheels stays within justifiable limits. When driving off in the first gear a limitation to approximately 2,000 rpm has proved to be advantageous. Drivers, who cause a driven wheel to spin during a burnout, rev the engine significantly higher than or as far as into a limited range. By limiting the rotational speed a further spinning of the drive wheels can be stopped in the case of weaker engines. In the case of stronger engines, a further spinning of the drive wheel cannot always be avoided with a limitation of the rotational speed, but at least the differential is not exposed to such high loads at lower rotational speeds.

The engine power can also be reduced by way of reducing a torque output by the engine, when a bit is set. The torque in the case of spark ignition engines can be influenced within a few milliseconds through an adjustment of an ignition timing and in the case of diesel engines by an adjustment of an injection timing. Because of this, the spinning drive wheel can be stopped or brought into a rotational speed range in which it regains static friction and moves the motor vehicle. Because of this, the motor vehicle can be rapidly transferred into a normal operating state.

According to a further embodiment, a burnout state is stored in a fault memory. Because of this, what happened to the motor vehicle can be retraced. In that a burnout state, in which a drive wheel was caused to spin, is stored, a vehicle mechanic can recognize through reading-out a relevant fault memory if a burnout was carried out.

According to an embodiment, a time duration during which a burnout state prevailed is stored in the fault memory. The fault memory can be integrated in a control unit. A diagnosis memory that is present in the motor vehicle can also be used.

According to another embodiment, from a certain time duration, during which a burnout state prevailed, an fault memory code lamp is activated. To this end, the value stored in the previously mentioned fault memory can be used. The duration of a plurality of burnouts can be added into a total duration and a fault memory signal can then be output to a fault memory code lamp when the total duration altogether is longer than a predetermined value. The value can be individually predetermined for different motor vehicles. In the case of motor vehicles with stronger motorization, a higher value can be assumed since in the case of sportive driving style it can quite easily happen that when driving off from the stationary state a wheel is always spinning. This can also happen more frequently in ice and snow. In the case of a normal utilization of the motor vehicle, no burnout should be stored. For displaying a burnout a fault memory code lamp can be used, which explicitly indicates a burnout carried out with the motor vehicle; however, a general engine pilot lamp can also be activated.

By adding additional parameters it can almost be excluded that a drive wheel is inadvertently caused to spin. In the case of motor vehicles, in which a parking brake is acting on non-driven wheels it can be detected in addition if the parking brake is activated or applied. Before carrying out a burnout the parking brake is sometimes activated so that the vehicle cannot move from the spot. When this is the case and a drive wheel is spinning, in particular for a longer period of time, this almost certainly takes place because it is desired by the driver. By detecting an activated parking brake a burnout can thus be detected even more reliably.

According to a further embodiment, it is detected if an anti-slip control is deactivated. An anti-slip control (ASR) can render spinning more difficult through targeted brake interventions and if applicable through intervention in an engine control at least when the motor vehicle is moving. Drivers desiring to carry out a burnout therefore deactivate the anti-slip control possibly beforehand, so that in a burnout state, in which a driven wheel is spinning, it can be assumed that this burnout state has been brought about. The probability of a fault memory detection of a burnout, according to which a wheel has not been caused to spin, but the motor vehicle merely stands partially on very slippery surface, can be further minimized by detecting a deactivated anti-slip control.

According to another embodiment, a torque output by the engine is additionally detected. At high torques, a driven wheel is more likely to have a tendency towards spinning.

The various embodiments of the described method can be provided in a drive train of a motor vehicle, in particular in a control unit. A control unit configured accordingly can comprise a storage means for this purpose, on which a corresponding computer program for carrying out the various embodiments of the method is stored.

Here, the computer program can comprise program code to carry out all steps of the method when the program is executed on a computer.

A computer program product having program code which are stored on a computer-readable data carrier is provided for carrying out the various embodiments of the method, when the program product is executed on a computer.

In an embodiment, the motor vehicle comprises an engine control for controlling a combustion engine of the motor vehicle, wherein the motor vehicle furthermore comprises:
a) means for detecting a rotational wheel speed of a first driven wheel and a rotational wheel speed of a second driven wheel and comparing a rotational wheel speed of a wheel rotating faster with a first constant,
b) means for detecting a vehicle speed and comparing the vehicle speed with a second constant,
c) means for detecting an engine rotational speed and comparing the engine rotational speed with a third constant,
d) wherein with means the burnout state is detected when one of the two detected rotational wheel speeds is greater than the first constant, the vehicle speed is below the second constant and the engine rotational speed is above the third constant.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
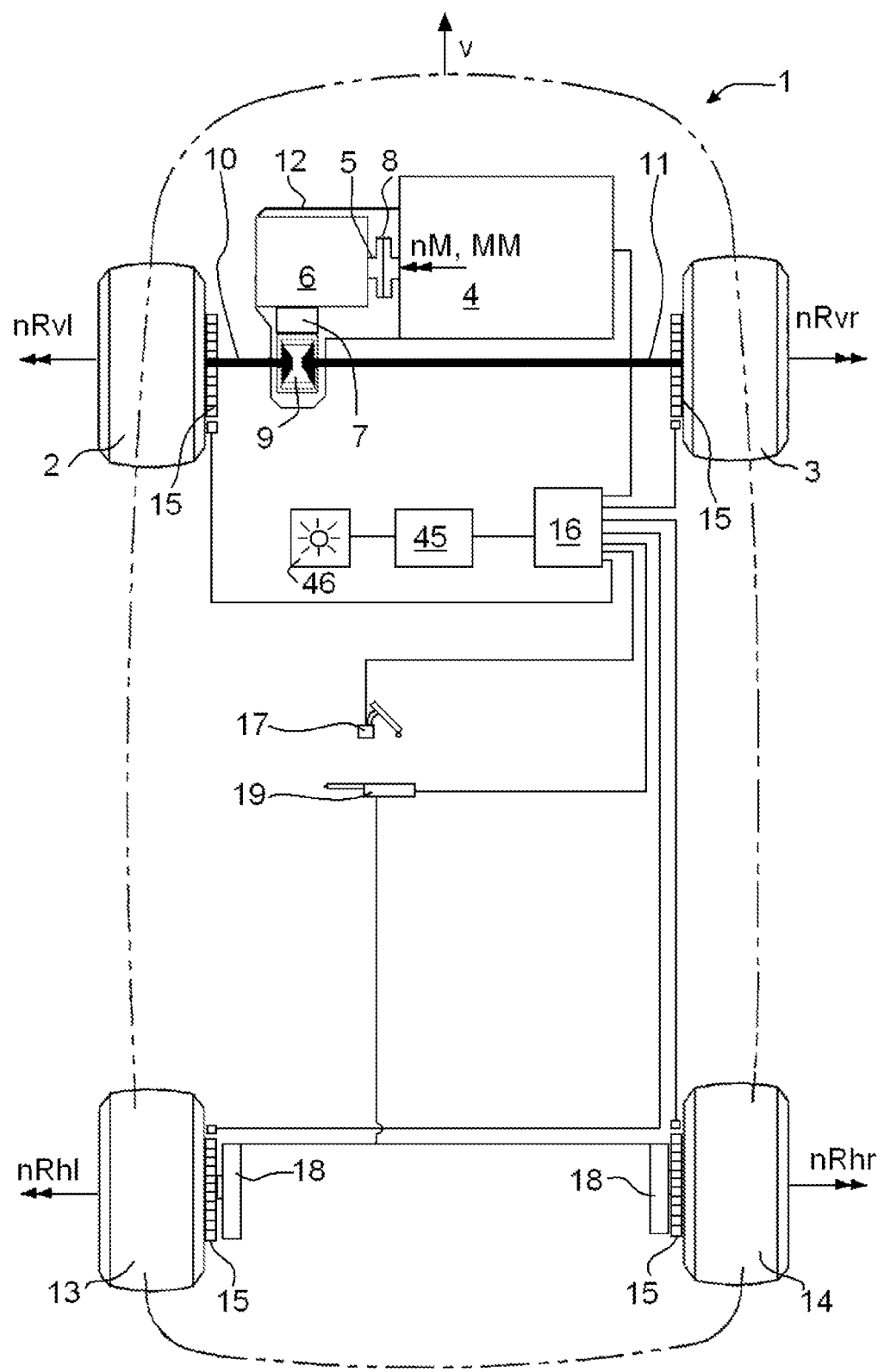
FIG. 1 is a schematic representation an outline of a motor vehicle having an engine and a transmission, in accordance with an exemplary embodiment.

In FIG. 1, an outline of a motor vehicle 1 having two driven wheels 2 and 3 is shown in a schematic representation. The motor vehicle 1 comprises an engine 4. The engine 4 can be operated with different rotation speeds nM, the engine outputting a variable torque MM dependent on an accelerator pedal position. By way of a clutch 8, a non-positive connection can be established between an engine output shaft and a transmission input shaft 5. A transmission 6 passes the torque on to a differential 9 via a transmission output shaft 7. The differential 9 distributes the introduced torque via drive shafts 10 and 11 to the two wheels 2 and 3. The transmission 6 as well as the differential 9 is arranged in a common housing 12.

On the driven wheels 2 and 3 as well as on the non-driven wheels 13 and 14, rotational speed sensors 15 are arranged. The signals detected by the rotational speed sensors 15 are passed on for each wheel 2, 3, 13 and 14 to a control unit 16. The latter is configured to further process the signals of the rotational speed sensors 15. The shown motor vehicle 1 is a motor vehicle having a driven axle, i.e., the two front wheels 2 and 3 are driven and the rear wheels 13 and 14 are merely pulled along.

The signals detected by the rotational speed sensors 15 are passed on to a control unit 16. This can be a control unit for an electronic stability program (ESP), for an anti-slip control (ASR), an engine control or the like, wherein a function for detecting a driven wheel 2 or 3 caused to spin is implemented. The control unit 16 is preferentially configured in order to influence the engine 4, namely either directly or via an engine control that is not shown.

One of the rear rotational speed sensors 15 can be used in order to determine a vehicle speed v. This can be determined from a known dynamic rolling radius and one of the rotational wheel speeds nRhl or nRhr. To this end, a separate sensor that is not shown can also be used. It is provided that the control unit 16 recognizes when the driver causes a wheel 2 or 3 to spin. This is initiated by the driver in that in the stationary state she/he depresses the accelerator pedal 17 relatively far and quickly engages the clutch 8. In this exemplary embodiment with a front wheel driven motor vehicle 1 without differential lock, the wheel 2 or 3 with which the so-called static friction changes into sliding friction will spin first. In this burnout state, the spinning wheel 2 or 3 slides on a surface on which the motor vehicle 1 is standing. In the case of motor vehicles having a differential lock (not shown), the drive shafts 10 and 11 can be coupled together in an approximately or completely rotationally fixed manner. In this case, both driven wheels 2 and 3 spin simultaneously in the case of a burnout.

The motor vehicle 1 comprises two parking brakes 18 acting on the rear wheels 13 and 14, which can be activated via a handbrake lever 19 in the vehicle interior. With the parking brakes 18, the two rear wheels 13 and 14 can be blocked, so that the motor vehicle cannot roll away. However, the parking brakes 18 can also be used in order to hold the motor vehicle 1 in position on the spot when one or both driven wheels 2 and 3 are caused to spin (i.e. a burnout is carried out). It is provided that the control unit 16 can recognize furthermore if the parking brakes 18 are activated. To this end, the parking brakes 18 or the handbrake lever can be connected to the control unit 16 in signal terms.

With the number of detectable and detected parameters, the reliability with which a burnout can be doubtlessly recognized increases. In principle, only few parameters such as for example the vehicle speed v, the rotational speed nM and a rotational wheel speed nRvl or nRvr of a spinning wheel 2 or 3 suffice. When in this case the vehicle speed v is almost zero, the engine rotational speed nM is disproportionately high and accordingly also the rotational wheel speed of a wheel 2 or 3 is high, it is at least predominantly probable that the driver is deliberately bringing about the burnout state. However, it is also possible that the motor vehicle 1 stands on a slippery surface and for this reason the wheel 2 or 3 is spinning. It is therefore provided to reduce the engine power output by the engine 4 during a burnout. This can take place steadily and unknown to the driver. Should the wheel 2 or 3 stand on a slippery surface it is more likely to regain traction with decreasing rotational wheel speed nRvl or nRvr than when it spins. In this regard, an anti-slip control ASR is not capable to prevent a wheel from spinning at a vehicle speed from zero or near zero. The reason for this is that a comparison with the rotational speeds of the other wheels is continuously carried out. Even when the system intervenes, it can merely reduce the rotational wheel speed of a spinning wheel through short brake interventions, but not stop the wheel. Only when the motor vehicle moves can individual wheels be prevented from spinning through brake intervention and with some ASR-systems also through intervention in an engine control, since a comparison with the rotational wheel speeds of non-spinning or rolling wheels 13 or 14 is possible. Nevertheless, the anti-slip control is frequently deactivated by drivers before a burnout is being carried out so that in fact no brake intervention takes place at all. Furthermore, the electronic stabilizing program ESP is frequently also deactivated so that it does not intervene.

Figure 2:
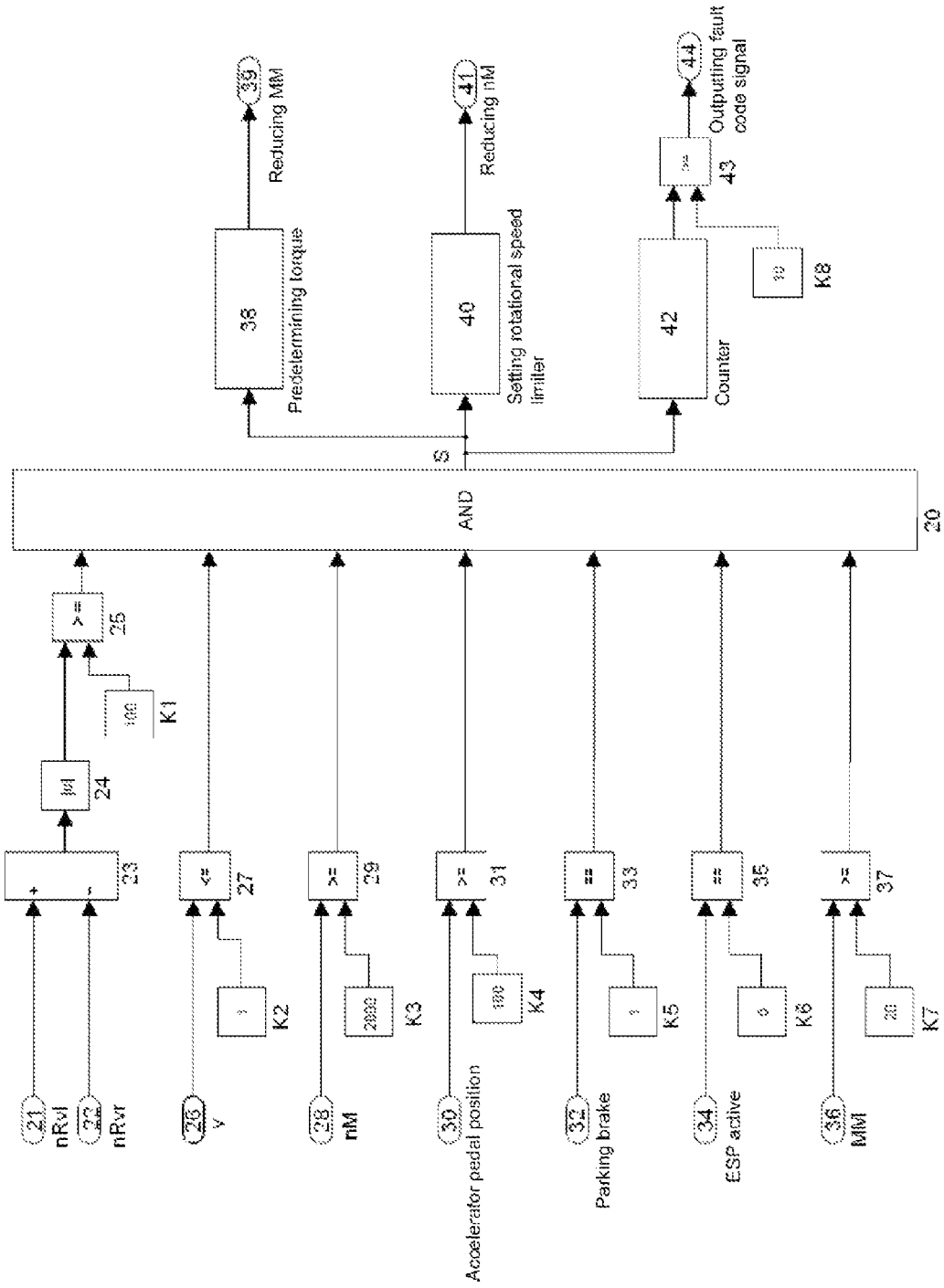
FIG. 2 is a schematic block diagram illustrating a method for detecting wheels caused to spin in a motor vehicle, in accordance with an exemplary embodiment.

A possible sequence of a method for recognizing driven wheels caused to spin is shown in a schematic block diagram in FIG. 2. For reliably detecting a burnout it is advantageous but not absolutely necessary to detect further parameters via the rotational wheel speed nRvl or nRvr of the spinning wheel 2 or 3, of the vehicle speed v, and of the engine rotational speed nM. With the block diagram shown in FIG. 2, which can be continuously executed on a computer in operation, an AND operator 20 is activated in the presence of certain parameters, which will then set a bit S from 0 to 1 or from 1 to 0. The steps 21 to 37 described in the following can be carried out almost in parallel time, which is represented by the simultaneous start on the left in the block diagram.

In a first step 21, the rotational wheel speed nRvl of the left front wheel 2 is detected (here, exemplarily, in the dimension revolutions per minute or rpm). In a second step 22, the rotational wheel speed nRvr of the right front wheel 3 is detected. The value nRvr is deducted from the value nRvl in a third step 23. From the value so obtained the amount is formed in a fourth step 24 in order to obtain a positive sign. The value so obtained is compared with a constant K1 in a fifth step 25. As exemplary value for the constant K1, a value of 100 rpm was selected here. Instead of a constant value, values from a characteristic curve or from a family of characteristics (both not shown) can also be utilized. If one of the rotational wheel speeds nRvl or nRvr is above 100 rpm, a corresponding signal is output to the AND operator 20.

In parallel to this, the vehicle speed v is detected in a sixth step 26 and in a seventh step 27 compared with a constant K2, which can have the dimension kilometer per hour (km/h). Among other things, burnouts are characterized in that the motor vehicle 1 moves only very slowly or not at all. As a rule, a driver wishing to carry out a burnout will bring the motor vehicle 1 to a halt beforehand. For this reason, a value lower than 1 km/h was selected for the constant K2 in this exemplary embodiment. Thus, a signal is output to the AND operator 20 when the vehicle speed v is below 1 km/h.

In addition, an engine rotational speed nM is detected in an eight step 28 and on the other hand compared with a constant K3. The constant K3 in this exemplary embodiment was set to 2,000 rpm. During a burnout, the driver will rev the engine 4 very high as a rule and quickly activate the clutch so that a wheel 2 or 3 loses its surface traction or static friction and spins. In the case of more powerful engines a relatively low rotational speed of 2,000 rpm can already be sufficient in order to cause a wheel 2 or 3 to spin. The value for K3 however is merely exemplary. On the other hand, a value from a characteristic curve or from a family of characteristics can be set instead of a constant. If the engine rotational speed nM at any rate exceeds K3, a signal is output to the AND operator 20.

As described in FIG. 1 in connection with the accelerator pedal 17, the motor vehicle 1 comprises means for detecting an accelerator pedal position. The accelerator pedal position for example can be set to values between 0 and 100 (percent), wherein 100 marks a maximum deflection or full throttle and 0 an un-actuated position of the accelerator pedal 17. The value is output to the control unit 16. Corresponding to the step 30, the accelerator pedal position is detected and in a step 31 compared with a constant K4, for which likewise a 10 was selected. The value can be utilized as comparison value since drivers wishing to carry out a burnout will usually apply full throttle in order to elicit the maximum engine power. Accordingly, a signal is output to the AND operator 20 when the accelerator pedal 17 (see FIG. 1) is fully depressed and the value of the accelerator pedal position corresponds to the constant K4.

In step 32 it is determined, furthermore, if the parking brake (see FIG. 1, reference number 18) or the handbrake lever (see FIG. 1, reference number 19) is activated. To this end, the activation of the parking brake 18 is assigned a value of 1 and a deactivation a value of 0, wherein these values are independent of any possible play and wear compensation travel of the parking brake 18. Upon activation, the determined value corresponds to the value of the fifth constant K5 and a signal is output to the AND operator 20. The parameter of the parking brake 18 can be utilized for recognizing a carried-out burnout since the parking brake 18 is usually actuated beforehand so that the motor vehicle 1 remains on the spot and the wheel 2 or 3 can be more easily caused to spin.

Similarly, it is detected in a step 34 if an electronic stability program ESP is activated. This takes place in that a deactivation of the ESP is given a value of 0. In a step 35, this value is compared with a constant K6, which was likewise set to 0. Drivers wishing to cause a wheel to spin are likely as a rule to deactivate the ESP insofar as this is possible, so that it does not brake the spinning wheel 2 or 3 through targeted brake intervention, thus stopping or moderating the spinning. With deactivated ESP, a signal is output to the AND operator 20. In principle, it can be determined in the same manner if an anti-slip control ASR is deactivated.

Furthermore, as further parameter, a torque MM output by the engine 4 can be detected in a step 36 and compared with a constant K7 in a step 37. The constant K7 is set to 20 newton meter (nM) merely as an exemplary value, wherein at 2,000 rpm and the corresponding accelerator pedal position, this is exceeded with many engines.

In the presence of the parameters described above in connection with FIG. 2 or exceeding and undershooting of the constants K1 to K7, the AND operator reacts in that it sets a bit S. It is assumed that in the presence of the parameters described above a wheel is almost certainly caused to spin and the driver is not only interested merely in making headway. As reaction to this, a lower torque can be predetermined for the engine 4 in a step 38. The torque can be influenced in the case of a spark ignition engine for example by way of changing the ignition timing. In the case of a diesel engine, the injection timing can be changed in order to reduce the torque. As reaction to this, the torque MM output by the engine 4 is gradually, for example steadily, reduced to a lower value over a certain period of time in a step 39. The power output by the engine is reduced because of this. The reduction of the engine power or reduction of the torque MM results in that the torque MM from a certain point of time that is dependent on numerous environmental conditions is no longer sufficiently high in order to continue to hold the spinning wheel 2 or 3 in its spinning state. The wheel 2 or 3 will regain static friction and accelerate the motor vehicle 1. Here, the torque is steadily reduced so that the driver does not preferably notice the intervention. Two objectives are pursued with the reduction of the torque MM or the power. Firstly, the driver is to be prevented from causing a wheel 2 or 3 to spin so that the differential 9 is not damaged or in the case of motor vehicles with differential lock (not shown) the drive shafts, wheels and other components in the drive train are not unnecessarily worn. Secondly, in the case of inadvertent spinning of a wheel 2 or 3 a type of starting aid is realized through the reduction of the torque, since on a slippery surface a spinning wheel 2 or 3 can be effective to move the motor vehicle 1 from the spot. Here, a lower torque MM is helpful. The steady reduction of the torque MM helps "catching" the wheel 2 or 3, i.e. to bring it into a rotational speed range in which it regains static friction.

To realize the second functionality it can be provided not to make some parameters such as for example the activation of the parking brake 17, the activation of the ESP, the accelerator pedal position and the engine torque MM not required for this purpose a condition for outputting a bit. The block diagram shown in FIG. 2 merely serves to indicate a solution for the motor vehicle 1 with front wheel drive without differential lock shown in FIG. 1. Obviously, the method contemplated herein can also be applied with motor vehicles having a differential lock, wherein it is sufficient here to detect one of the two rotational wheel speeds nRvl and nRvr. This similarly applies to motor vehicles with rear wheel drive. In the case of motor vehicles with rear wheel drive and with a parking brake acting on the rear axle, detecting an activated parking brake is not practical.

Again making reference to FIG. 2, a rotational speed limiter acting on the engine 4 can again be employed in the presence of a bit S in a step in order to reduce the output power of the engine 4 in a step 41. Because of this, the spinning wheel 2 or 3 can likewise be braked.

In a further step 42, in the presence of a bit S, a fault memory 45 (see FIG. 1) is activated, which is assigned to the control unit 16. In the fault memory 45, the duration for example of one or a plurality of burnouts carried out one after the other can be added. The value so obtained can be compared with a constant K8 in a step 43. On exceeding a total duration of for example 10 seconds it is assumed that this was not carried out for example by mistake and a fault memory code signal is output in a step 44. In the presence of a fault memory code signal, a corresponding fault memory code lamp 46 can be activated. This can be a separate fault memory code lamp 46, which explicitly indicates a burnout carried out with the motor vehicle 1; however, an engine pilot lamp that is mostly present in motor vehicles can also be activated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for detecting a burnout state during which driven wheels of a motor vehicle are caused to spin, the method comprising the steps of:

detecting a rotational wheel speed of a first driven wheel and a rotational wheel speed of a second driven wheel, determining the difference between the rotational wheel speed of the first driven wheel and the rotational wheel speed of the second driven wheel, and comparing, in a control unit, the absolute value of the difference with a first constant, detecting a vehicle speed and comparing, in the control unit, the vehicle speed with a second constant, wherein the second constant is less than or equal to about 5 km/h, and detecting an engine rotational speed and comparing, in the control unit, the engine rotational speed with a third constant, wherein the burnout state is detected if and only if the absolute value of the difference between the rotational wheel speed of the first driven wheel and the rotational wheel speed of the second driven wheel is greater than or equal to the first constant, the vehicle speed is less than or equal to the second constant, and the engine rotational speed is greater than or equal to the third constant.

2. The method according to claim 1, wherein in a detected burnout state a bit is set.

3. The method according to claim 1, wherein in the burnout state an engine power is steadily reduced to a lower value.

4. The method according to claim 1, wherein in the burnout state an engine power is reduced via a reduction of the engine rotational speed.

5. The method according to claim 1, wherein in the burnout state an engine power is reduced via a reduction of an engine torque.

6. The method according to claim 1, wherein the burnout state is stored in a fault memory.

7. The method according to claim 1, wherein a duration of the burnout state is stored in an fault memory.

8. The method according to claim 1, wherein from a certain time duration, during which the burnout state prevailed, a fault memory code lamp is activated.

9. The method according to claim 1, the method further comprising the step of: detecting if a parking brake is activated or pulled; and wherein the burnout state is detected when the absolute value of the difference between the rotational wheel speed of the first driven wheel and the rotational wheel speed of the second driven wheel is greater than or equal to the first constant, the vehicle speed is less than or equal to the second constant, the engine rotational speed is greater than or equal to the third constant, and the parking brake is activated or pulled.

10. The method according to claim 1, the method further comprising the step of:

detecting if an anti-slip control is deactivated, and wherein the burnout state is detected when the absolute value of the difference between the rotational wheel speed of the first driven wheel and the rotational wheel speed of the second driven wheel is greater than or equal to the first constant, the vehicle speed is less than or equal to the second constant, the engine rotational speed is greater than or equal to the third constant, and the anti-slip control is deactivated.

11. The method according to claim 1, the method further comprising the step of:

detecting an engine torque.

12. A motor vehicle having a control unit comprising a storage device with a computer program stored thereon, wherein the computer program is configured for carrying out a method for detecting a burnout state during which driven wheels of the motor vehicle are caused to spin, the method comprising the steps of:

detecting a rotational wheel speed of a first driven wheel and a rotational wheel speed of a second driven wheel, determining the difference between the rotational wheel speed of the first driven wheel and the rotational wheel speed of the second driven wheel, and comparing the absolute value of the difference with a first constant, detecting a vehicle speed and comparing the vehicle speed with a second constant, wherein the second constant is less than or equal to about 5 km/h, and detecting an engine rotational speed and comparing the engine rotational speed with a third constant, wherein the burnout state is detected if and only if the absolute value of the difference between the rotational wheel speed of the first driven wheel and the rotational wheel speed of the second driven wheel is greater than or equal to the first constant, the vehicle speed is less than or equal to the second constant, and the engine rotational speed is greater than or equal to the third constant.

13. The method of claim 1, wherein second constant is between about 1 km/h and about 5 km/h.

14. The method of claim 1, wherein second constant is less than or equal to about 1 km/h.

* * * * *